No. 634,436. Patented Oct. 3, 1899.
F. T. BALDWIN & M. E. TURNURE.
HOOF PAD.
(Application filed Dec. 23, 1898.)
(No Model.)
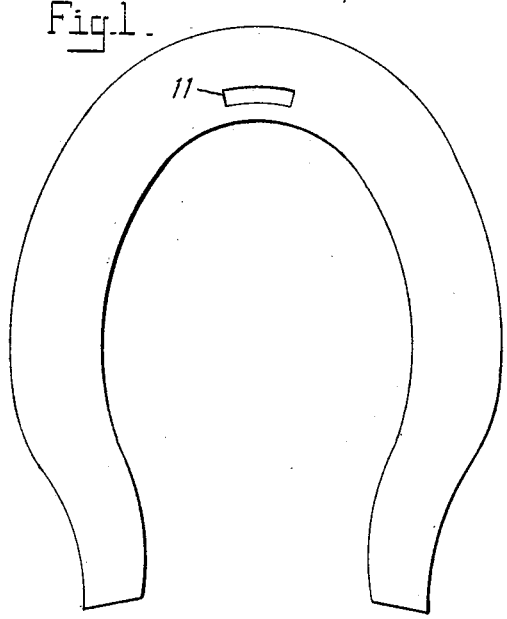
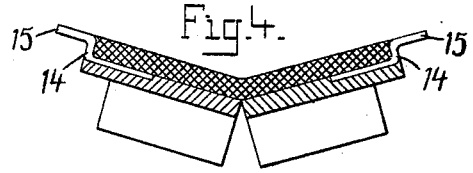
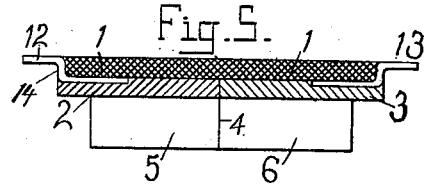
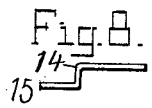
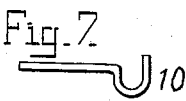
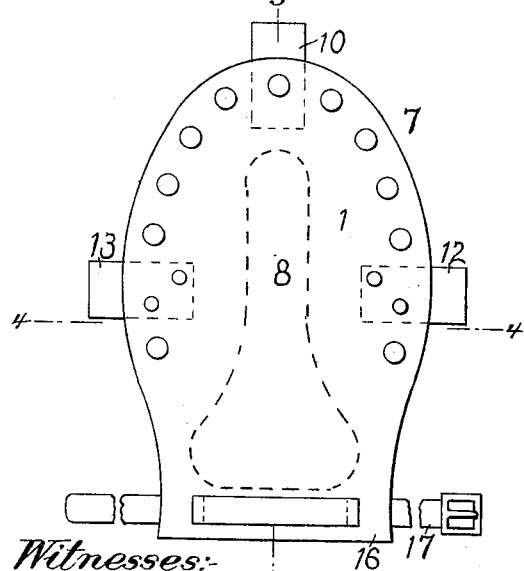
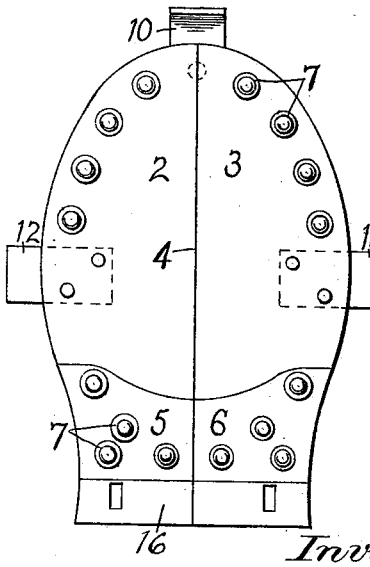
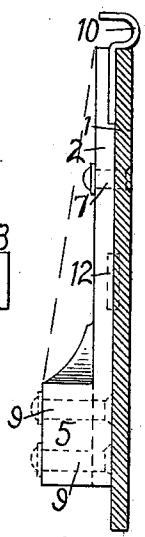
Witnesses:
Inventors

UNITED STATES PATENT OFFICE.

FRANKLIN T. BALDWIN, OF BALDWINSVILLE, AND MARY E. TURNURE, OF NEW YORK, N. Y.

HOOF-PAD.

SPECIFICATION forming part of Letters Patent No. 634,436, dated October 3, 1899.

Application filed December 23, 1898. Serial No. 700,090. (No model.)

*To all whom it may concern:*

Be it known that we, FRANKLIN T. BALDWIN, residing at Baldwinsville, in the county of Onondago, and MARY E. TURNURE, residing at New York, in the county of New York, State of New York, citizens of the United States, have invented certain new and useful Improvements in Hoof-Pads, of which the following is a specification.

In the accompanying drawings, Figure 1 is a top view of a horseshoe adapted to receive our hoof-pad. Fig. 2 is a top view of the pad detached from the hoof. Fig. 3 is a bottom view of the same. Fig. 4 is a cross-section of the same on the line 4 4 of Fig. 2, viewed from the front, bent for insertion into the shoe. Fig. 5 is the same straightened out. Fig. 6 is a longitudinal section of the same on the line 5 5 of Fig. 2. Figs. 7 and 8 are details of the lugs.

1 is a piece of material of proper form to fit inside the shoe against the hoof. We prefer that this material be thick leather; but other material may be employed as the equivalent thereof having sufficient softness to cushion the frog of the hoof and sufficient flexibility to admit of being bent transversely for insertion into the shoe, as hereinafter described, but of sufficient rigidity to hold its position against the hoof when in place.

2 3 is a layer of material divided into two parts on the central longitudinal line 4. We prefer that this material be composed of layers of leather or of heavy canvas or duck and rubber vulcanized together similar to the material used for vulcanized rubber belting, or other material may be employed as the equivalent thereof having sufficient rigidity to confine the bending of the pad substantially to the longitudinal line 4 and yet sufficient pliability to yield uniformly in all directions to the pressure of the hoof under the weight of the animal.

5 6 is a piece also divided on the longitudinal line 4, which piece serves to thicken the pad at the heel and make the cushion-bearing for the foot. These pieces 5 6 may be integral with the pieces 2 3 or made separate therefrom, as indicated in the dotted line of Fig. 6. They may be confined to the heel, as shown in full lines, Fig. 6, or may be extended toward the toe with decreasing thickness, as shown by the dotted line, Fig. 6. If not made integral with the pieces 2 3, the pieces 5 6 may be composed of leather.

The outsole 2 3 and heel 5 6 are secured to the insole 1 preferably by copper rivets 7 7, &c., placed in such position, as shown, as to avoid coming under any portion of the frog of the hoof, the position of which frog is indicated by the dotted line 8 of Fig. 2. If the heel-pieces 5 6 are not integral with the outsole 2 3; they may be held thereto by copper rivets, (indicated by the dotted lines 9 9,) which do not extend through the insole 1, so that the insole serves as a cushion between the heel of the frog and the heads of said rivets 9 9.

For securing the pad in position in the shoe a lug 10 of the form shown in Fig. 7 is riveted to the insole 1, so as to project from the toe thereof in position to hook into the slot 11 of the shoe. This lug 10 extends only so far back from the toe as to admit being strongly riveted and not so far as to substantially underlie the frog. By employing a broad hook of the form shown in combination with the curved slot 11 in the shoe we produce the best construction for ready engagement of the hook with the slot and prevention of side movement after the pad is in place.

12 and 13 are two lugs each of the form shown in Fig. 8. One of these is riveted to each side of the insole 1, so as to project on each side of the pad. Each of them extends inward from the edge of the pad only a sufficient distance for being securely fastened to the pad and not so far as to substantially underlie the frog. Each of them is provided with a shoulder 14, so that when the extremity 15 extends between the hoof and the shoe the shoulder 14 will rest against the inner edge of the shoe.

While the natural tendency of the insole to lie flat normally tends to hold the pad flat, as indicated in Fig. 5, yet it is sufficiently resilient or yielding to permit, after the engagement of the hook 10 with the slot 11, of being bent on the longitudinal line 4, as indicated in Fig. 4, so that the extremities 15 15 of the lugs 12 13 are brought close enough together to permit of the extremities being inserted between the shoe and the hoof. When so inserted, the pad is pressed flat against the foot, and the weight of the animal tends to so hold it.

Generally nothing further is required for holding the pad in position; but we may, if desired, rearwardly extend the insole, as shown at 16, Fig. 2, so as to receive a strap 17, adapted to be buckled over the hoof.

The under surface of the outsole 2 3 and heel 5 6 may be corrugated or otherwise roughened, if desired, to further prevent slipping. In practice the combined insole and outsole may be made of such thickness that the under surface of the pad is at least flush with the under surface of the shoe and therefore presents in contact with the pavement a maximum amount of pad-surface to prevent slipping.

We claim—

A hoof-pad consisting of an insole 1, a divided outsole 2, 3, a divided heel, 5, 6, and lugs 10, 12 and 13 adapted for insertion between the shoe and hoof, substantially as described; whereby the side lugs may be inserted by bending the insole longitudinally, as set forth.

Signed at Baldwinsville, in the county of Onondaga and State of New York, this 5th day of October, A. D. 1898.

FRANKLIN T. BALDWIN.
   MARY E. TURNURE.

Witnesses as to signature of Franklin T. Baldwin:
 JACOB C. KENYON,
 HOWARD M. BALDWIN.

Witnesses as to signature of Mary E. Turnure:
 J. C. GREER,
 FRED S. KEMPER.